US008726258B2

(12) United States Patent
Mortensen

(10) Patent No.: US 8,726,258 B2
(45) Date of Patent: May 13, 2014

(54) SUPPORTING MULTIPLE HARDWARE COMPONENTS IN UEFI

(75) Inventor: James L. Mortensen, Lynnwood, WA (US)

(73) Assignee: Phoenix Technologies Ltd., Milpitas, CA (US)

(*) Notice: Subject to any disclaimer, the term of this patent is extended or adjusted under 35 U.S.C. 154(b) by 341 days.

(21) Appl. No.: 13/086,853

(22) Filed: Apr. 14, 2011

(65) Prior Publication Data
US 2012/0266148 A1    Oct. 18, 2012

(51) Int. Cl.
*G06F 9/44* (2006.01)

(52) U.S. Cl.
USPC .............................. 717/163; 717/162; 717/164

(58) Field of Classification Search
None
See application file for complete search history.

(56) References Cited

U.S. PATENT DOCUMENTS

| | | | | |
|---|---|---|---|---|
| 7,028,294 | B2* | 4/2006 | Cyran et al. | 717/164 |
| 7,281,243 | B2* | 10/2007 | Rothman et al. | 717/163 |
| 7,503,040 | B2* | 3/2009 | Wiebe et al. | 717/164 |
| 7,694,291 | B2* | 4/2010 | Chen et al. | 717/162 |
| 7,886,285 | B2* | 2/2011 | Asselin et al. | 717/163 |
| 2005/0144608 | A1* | 6/2005 | Oyama et al. | 717/162 |
| 2005/0204351 | A1* | 9/2005 | Jiang et al. | 717/162 |
| 2006/0026584 | A1* | 2/2006 | Muratori et al. | 717/163 |
| 2006/0070053 | A1* | 3/2006 | Andersen et al. | 717/163 |
| 2006/0184924 | A1* | 8/2006 | Hsieh | 717/140 |
| 2007/0050762 | A1* | 3/2007 | Chen et al. | 717/169 |
| 2009/0287918 | A1 | 11/2009 | Goldstein et al. | |
| 2010/0011197 | A1* | 1/2010 | Harmer | 713/1 |
| 2010/0077388 | A1* | 3/2010 | Kimura | 717/158 |
| 2010/0318778 | A1* | 12/2010 | Jones | 713/1 |
| 2010/0318779 | A1 | 12/2010 | Jones | |
| 2010/0318961 | A1* | 12/2010 | Khoruzhenko et al. | 717/107 |
| 2011/0029764 | A1 | 2/2011 | Harmer et al. | |
| 2011/0271268 | A1* | 11/2011 | Dang | 717/168 |

OTHER PUBLICATIONS

Zhang et al., "A Trusted Bootstrap Scheme on EFI," 2009 International Conference on Multimedia Information Networking and Security, vol. 1, pp. 200-204.*
Fang et al., "Research and Realization of Trusted Computing Platform Based on EFI," Second International Symposium on Electronic Commerce and Security, 2009 (ISECS '09), vol. 1, pp. 43-46.*
Weimin et al., "Design and implementation of UsbKey device driver based on Extensible Firmware Interface," 9th International Conference on Signal Processing, 2008. ICSP 2008, pp. 2833-2836.*

* cited by examiner

*Primary Examiner* — Thuy Dao
*Assistant Examiner* — Stephen Berman
(74) *Attorney, Agent, or Firm* — Brokaw Patent Law PC; Christopher J. Brokaw

(57) ABSTRACT

Approaches for customizing a unified extensible firmware interface (UEFI) compatible firmware component to support multiple hardware components. The UEFI compatible firmware component may be implemented by linking one or more executive drivers created in an executive module of the firmware component. The executive drivers, instead of platform drivers, are executed by UEFI dispatchers. The platform module, rather than being a collection of drivers, functions as a platform library that links to the executive drivers. One or more programs for providing one or more library functions to the one or more executive drivers are also linked into the firmware component. Call outs to board library functions provided by a board module are implemented in the executive drivers, instead of drivers of the platform module. The board library functions replace the one or more library functions provided to the executive drivers and reflect a change in a customer reference board (CRB).

14 Claims, 4 Drawing Sheets

SUPPORTING MULTIPLE HARDWARE COMPONENTS IN UEFI

FIELD OF THE INVENTION

The disclosure herein relates to firmware, conforming to the Unified Extensible Firmware Interface (UEFI) protocol, which may support multiple hardware components.

BACKGROUND

The Unified Extensible Firmware Interface Forum (the "UEFI Forum") is an alliance between several leading technology companies to modernize the booting process by use of a new protocol, the Unified Extensible Firmware Interface (UEFI) protocol. The UEFI Forum has published several versions of the UEFI protocol, the latest being version 2.3 on May 9, 2009.

Many microchip (or "chip") manufactures provide their customers with Customer Reference Boards (CRBs) as platforms to allow their customers to evaluate the chips supplied by the chip manufacturer. These platforms may include other hardware, software, or embedded firmware components, some of which may be tailored to a particular application of the manufacturer's customer. Customers of the chip manufacturer are entitled to install the platform on one or more systems/devices (e.g., servers, personal computers, etc.) in order to evaluate the respective chip for their application. The embedded firmware in CRBs (also known as platform firmware) may include one or more Unified Extensible Firmware Interface (UEFI) component, each performing as a programming interface between the operating system (OS) of the system and the embedded firmware of the platform. The UEFI component also performs the function of platform initialization.

The Platform Initialization Working Group (PIWG) of the UEFI Forum provides specifications that are intended to promote interoperability between firmware components provided by various entities, such as silicon vendors and firmware vendors. These specifications provide a common internal framework for developers of hardware components and platform drivers A challenge of using UEFI arises from the large amount of effort required to perform customization of UEFI builds to suit the requirements of Original Equipment Manufacturers (OEMs), Original Device Manufacturers (OFM), and others. Such customization may be performed by adapting the firmware to support a new or revised hardware component provided by the OEM. Unfortunately, in the present state of the art, effecting such customization is time-consuming, error-prone, and costly.

BRIEF DESCRIPTION OF THE DRAWINGS

The present embodiments are described herein by way of example, and not by way of limitation, in the figures of the accompanying drawings and in which like reference numerals refer to similar elements, as follows.

DETAILED DESCRIPTION

Figure 1:
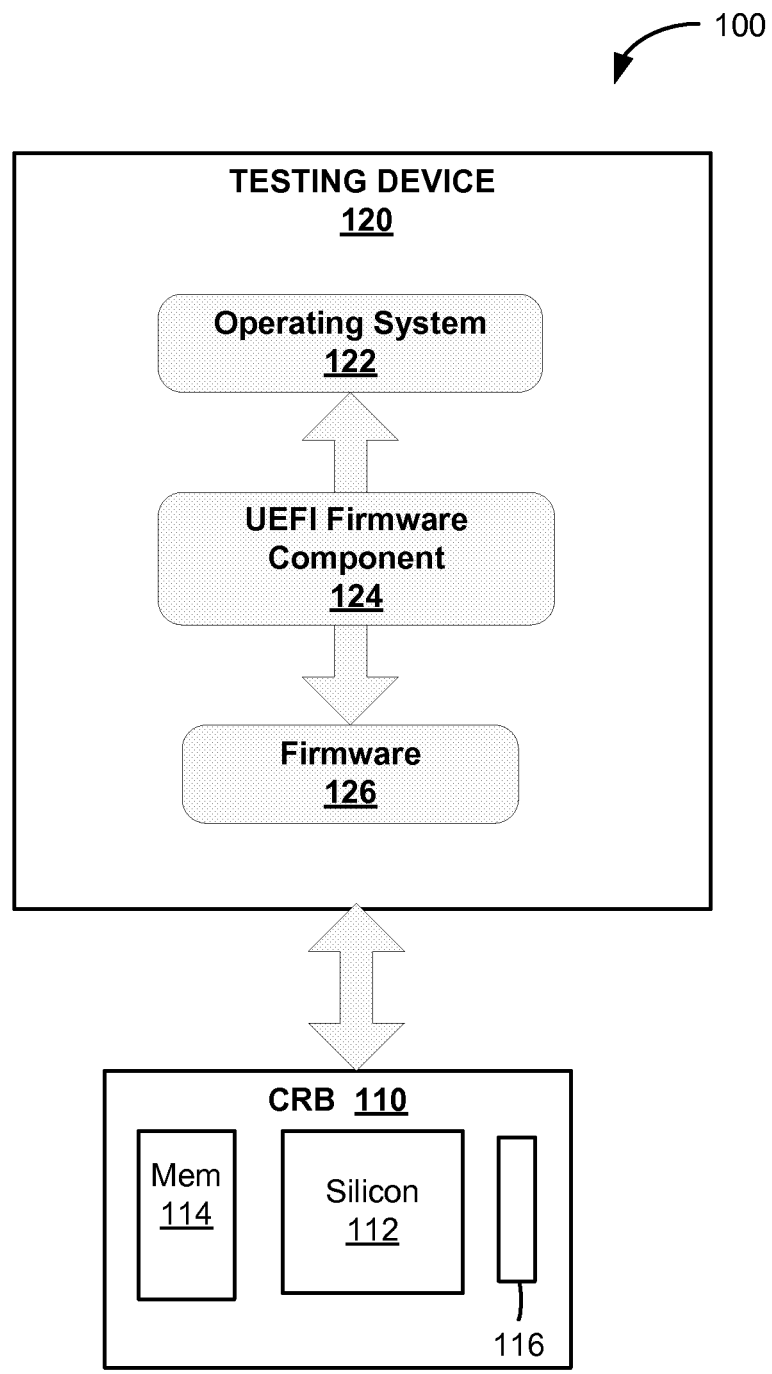
FIG. 1 is a block diagram of an evaluation system that provides a Unified Extensible Firmware Interface (UEFI) compatible firmware in accordance with some embodiments.

A method and apparatus for customizing a unified extensible firmware interface (UEFI) compatible firmware component are disclosed. In the following description, numerous specific details are set forth such as examples of specific components, circuits, and processes to provide a thorough understanding of the present disclosure. Also, in the following description, and for purposes of explanation, specific nomenclature is set forth to provide a thorough understanding of the present embodiments. However, it will be apparent to one skilled in the art that these specific details may not be required to practice the present embodiments. In other instances, well-known components may be shown in block diagram form to avoid obscuring the present disclosure.

According to embodiments of the invention, a firmware component which supports multiple hardware components is built. Building the firmware component may include linking one or more drivers into the firmware component. One or more programs for providing one or more library functions to the one or more drivers are also linked into the firmware component. Further, a board module is linked into the firmware component. The board module provides a board library function to replace one or more library functions previously linked to the one or more drivers. The board library function reflects a change in a Customer Reference Board (CRB). Advantageously, embodiments simplify the customization of UEFI compatible firmware to support various hardware components (such as a silicon chip). Hardware component suppliers may include Original Device Manufacturer (ODM) or Original Equipment Manufacturer (OEM). The hardware component suppliers may use the UEFI source code as a basis to support their design, which is based on the original CRB, but may differ from it substantially or trivially. For example, there may be hardware changes that are substantial in scope, but nonetheless, relatively limited in variety. These changes may include hardware port configuration for connection to external electronic devices and/or the use of memory of differing operational modes, types, sizes, performance, and so on, as compared with that on the CRB. In other situations, Input-Output (I/O) routing, Interrupt Request (IRQ) and Advanced Programmable Interrupt Controller (APIC) Routing may be selected to suit local needs. While, the OEM board may use the same semiconductor chip (herein referred to as "silicon component") as that on the CRB, small silicon components are often changed in the OEM board with respect to the CRB. The silicon component may comprise a chipset such as the one including a graphic and memory controller chip (e.g., a Northbridge chip) and an I/O controller chip (e.g., a Southbridge chip). The small silicon components may include super I/O, embedded controller, and the like. Other changes in the OEM board, as compared to the CRB, may include, for example, a different number of USB ports exposed, a dissimilar organization of PCI express slots, a distinct configuration of Northbridge and Southbridge chips, and so on.

In some embodiments, the firmware component includes a driver for a silicon component in the CRB. A silicon module may also be linked to include at least one UEFI compatible program for driving the silicon component. Linking a platform module including at least one UEFI compatible program to provide platform services to programs in the silicon module. The platform services may include a Pre-EFI (PEI) module to PEI module Interface (PPI) and a Driver Execution Environment (DXE) interface for use by programs in the silicon module. The linked drivers include executive platform drivers which are linked as a portion of an executive module including UEFI compatible programs for providing executive board library functions and executive platform library functions. The board library functions provided by the board module may include PEI and DXE phase board library functions.

FIG. 1 is a block diagram of an evaluation system 100 that provides a UEFI compatible firmware testing environment in accordance with some embodiments. Evaluation system 100 includes a testing device 120 and a customer reference board (CRB) 110. In some embodiments, testing device 120 may correspond to or comprise, inter alia, a Personal Computer (PC), a laptop, or any other device usable to test or evaluate a silicon chip (e.g., silicon chip 112) supplied by a hardware component supplier.

Testing device 120 includes an operating system (OS) 122, firmware 126, and a UEFI compatible firmware component 124. Operating system 122 may comprise a set of related programs that control operations of testing device 120 and allocation of various resources (not shown in FIG. 1, for simplicity) to a host of applications on testing device 120.

Firmware 126 may include programs/data structures that control internal/external devices (such as CRB 110) typically at low levels. Firmware 126 may reside in Programmable Logic Array (PLA), ROM, or flash memory. UEFI firmware component 124 functions as a programming interface between OS 122 and firmware 126 of testing device 120 and/or the embedded firmware of the platforms such as CRB 110.

In some embodiments, CRB 110 may be installed in an interface slot of testing device 120 or otherwise be coupled to testing device 120, via an external interface, for example, a Universal Serial Bus (USB). In an embodiment, CRB 110 may include a silicon chip 112, memory 114, and hardware 116 as depicted in FIG. 1. Silicon chip 112 may comprise or correspond to a silicon chip that is provided by the hardware component supplier for evaluation via use in CRB 110. A customer of hardware component supplier may wish to evaluate silicon chip 112 using evaluation system 110 to ensure that silicon chip 112 is suitable for the customer's needs, e.g., silicon chip 112 may need to perform in a specified manner to be suitable for use in an application of the customer. Memory 114 may include non-volatile memory such as Read Only Memory (ROM) or flash memory to include software/firmware programs to support functions performed by CRB 110. Hardware 116 may include or correspond to various logics/circuits to provide support such as power and communication interfaces for silicon chip 112 to be able to communicate with testing device 120.

Specific DXE interface protocols (i.e., the interface between drivers in the DXE phase) and PPIs (i.e., the interface between drivers in the PEI phase), such as the ones required of the platform module by silicon components, may vary between different hardware component suppliers and even between software supplied by a hardware component supplier for different silicon components. This holds true even for silicon devices that are disparate species of a shared genus. Customization at the DXE protocol and PPI layers requires expert knowledge of the specific third-party software components for each hardware device or functional component. Furthermore, knowledge of third-party component protocol and PPI interfaces is not typically transferrable to any other third-party component, even from the same vendor. In the present embodiments, the board library has an architected interface that is standard across all projects, and thereby reduces engineering efforts because it does not change as silicon component protocols and PPIs change.

Figure 2:
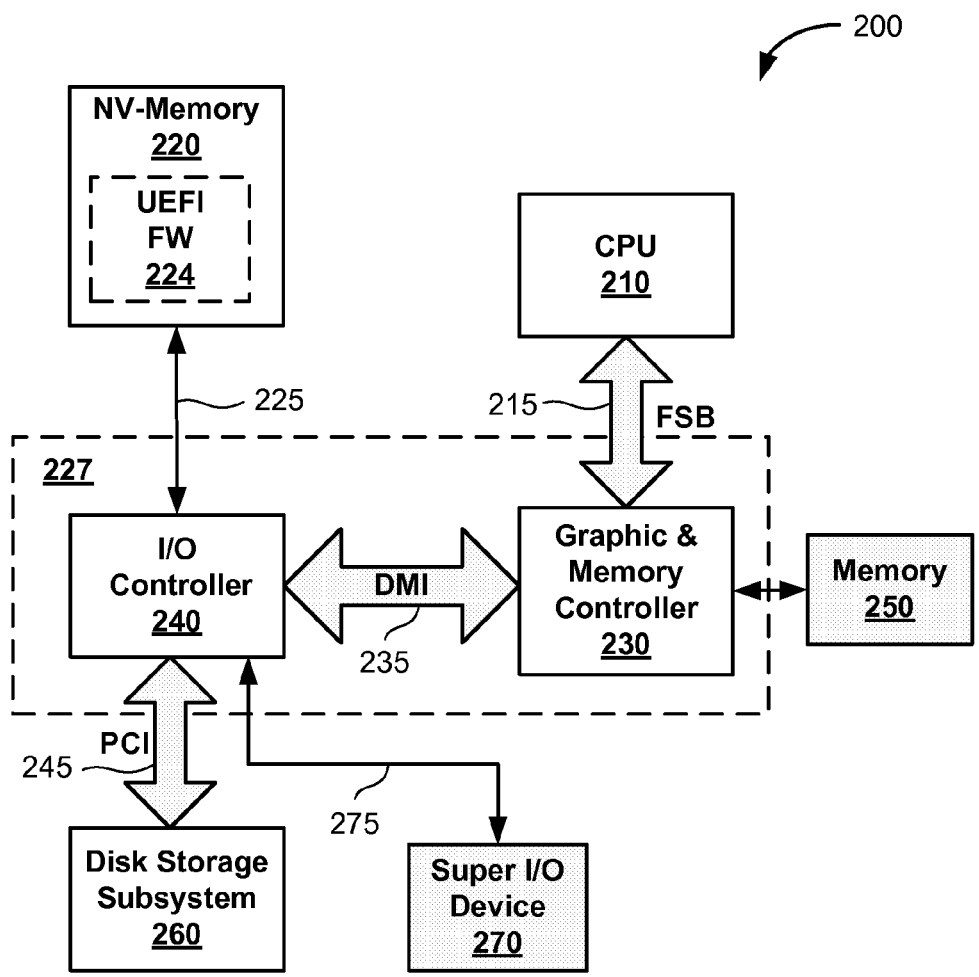
FIG. 2 is a block diagram of a system configured as a target system for loading and utilizing UEFI compatible firmware in accordance with some embodiments.

FIG. 2 is a block diagram of a system 200 configured as a target system for loading and utilizing UEFI compatible firmware 124 of FIG. 1 in accordance with some embodiments of the invention. System 200 includes a Central Processing Unit (CPU) 210, a Non-Volatile (NV) memory 220, a memory 250, a chipset 227, a disk storage subsystem 260, and super I/O device 270. CPU 210 operates in conjunction with chipset 227. CPU 210 may comprise more than one processor and performs, inter alia, arithmetic and logical operations necessary for the operation of system 200. System 200 may comprise or correspond to testing device 120 of FIG. 1 or any other computer, which is operative to provide an UEFI firmware environment 224 stored in NV-memory 220. UEFI firmware environment 224 provides a DXE interface protocol and a Boot Device Selection (BDS) phase interface. DXE and BDS are well known in the UEFI arts and are phases of a UEFI boot. An UEFI boot consists of the following phases: SEC (security), PEI (Pre-EFI Initialization), DXE (Driver Execution Environment), BDS (Boot Device Selection), RT (Run-Time), and AL (After Life).

The chipset 227 may include a graphic and memory controller 230, such as the known Northbridge chip, and an I/O controller 240, such as the known Southbridge chip. Graphic and memory controller 230 is coupled to CPU 210 by a Front Side Bus (FSB) 215, and typically provides an interface between CPU 210 and the remainder of system 200. Graphic and memory controller 230 also provides an interface to memory 250 and, possibly, to other devices such as an on-board graphics adapter (not shown in FIG. 2). Memory 250 may comprise the main memory of system 200, and may include Random Access Memory (RAM), Dynamic RAM (DRAM), and the like.

I/O controller 240 is coupled to graphic and memory controller 230 by a Direct Media Interface (DMI) 235. I/O controller 240 may be responsible for controlling many of the input/output functions of system 200 such as Universal Serial Bus (USB), sound adapters, Ethernet controllers, and one or more General Purpose Input/Output (GPIO) port (not shown in FIG. 2). A bus may comprise a Peripheral Component Interconnect (PCI) bus circuit 245, to which a disk storage subsystem 260 (hereinafter "disk 260") or other storage devices for storing an operating system and application programs may be attached. I/O controller 240 may also provide a peripheral interface 275 to couple a Super I/O device 270. Super I/O device 270 may include so-called "small silicon", such as any device, other than the silicon chip 112, included in CRB 110 of FIG. 1, for example, an embedded controller. I/O controller 240 may also incorporate a timer circuit for generating timer circuit interrupts typically at periodic intervals.

OS 122 of FIG. 1, which typically includes a set of programs that control operations of system 200 and allocation of various resources, may be stored on disk 260. One or more application programs may run on top of (i.e., be loaded and directed by) OS 122 and use computer resources made available through OS 122 to perform application specific tasks desired by a user of system 200. Disk 260 may also provide non-volatile storage for system 200. Although the description of computer-readable media contained herein refers to a mass storage device, such as a hard disk or Compact-Disc-ROM (CD-ROM) drive, it should be appreciated by those skilled in the art that computer-readable media can be any available media that can be accessed by system 200.

By way of example, and not limitation, computer-readable media may comprise computer storage media and communication media. Computer storage media includes volatile and non-volatile, removable and non-removable media implemented in a method or technology for storage of information such as computer-readable instructions, data structures, program modules or other data. Computer storage media includes, but is not limited to, RAM, ROM, Erasable Programmable ROM (EPROM), Electrically EPROM (EEPROM), serial EEPROM, Flash memory or other solid state memory technology, CD-ROM, Digital Versatile Disk (DVD), or other optical storage, magnetic cassettes, magnetic tape, magnetic disk storage or other magnetic storage devices well-known in the art, or any other medium which can be used to store the desired information and which can be accessed by the computer.

A peripheral interface 225 may connect NV-memory 220 to I/O controller 240. NV-memory 220 may include ROM or, more typically, a Non-Volatile Random Access Memory (NVRAM), such as flash memory, for storing UEFI platform firmware 224 that includes program code containing the basic routines that help to start up system 200 and to transfer information between elements within system 200. UEFI firmware 224 is compatible with the UEFI Specification.

System 200 may comprise any type of computing devices, including embedded computer systems, PCs, laptops, handheld computers such as tablets, Personal Digital Assistants (PDAs), and the like. System 200 may not include all of the components shown in FIG. 2, instead, it may include other components that are not explicitly shown in FIG. 2, or may utilize an architecture different from that shown in FIG. 2.

Figure 3:
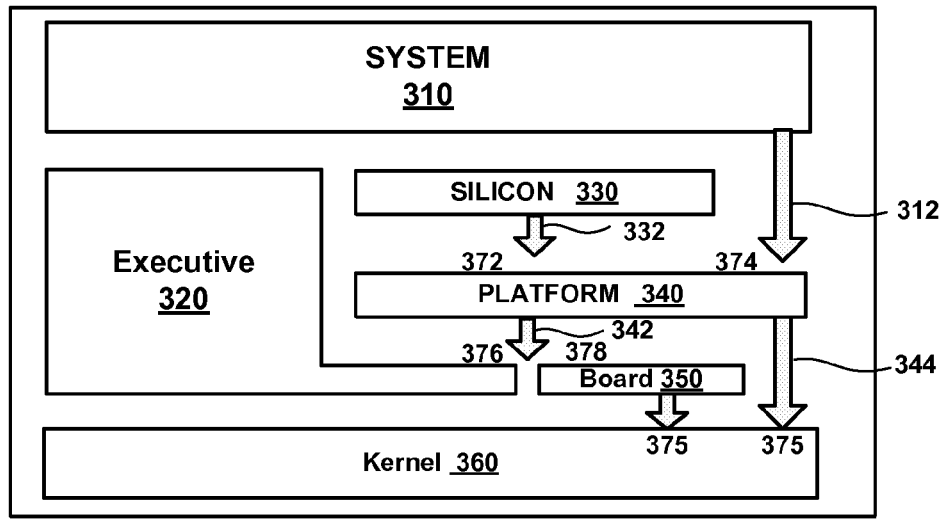
FIG. 3 is a block diagram illustrating platform customization interfaces between Kernel, Platform, and Board modules.

FIG. 3 is a block diagram illustrating an exemplary UEFI firmware component 124 according to an embodiment. The UEFI firmware component depicted in FIG. 3 shows platform customization interfaces between a kernel module 360, a platform module 340, and a board module 350. The architecture shown in FIG. 3 includes a system module 310, an executive module 320, one or more silicon modules 330, platform module 340, board module 350, and kernel module 360. Each module may comprise a collection of components, each of which may include a number of source files built into an object.

Silicon module 330 includes one or more sub-modules that are provided by hardware component suppliers to initialize specific hardware components, such as a silicon chip or a small silicon component. The sub-modules comprising silicon module 330 may be substantially un-architected, and may require any number of DXE Protocols and PPIs that may utilize any convenient structure. While only one silicon module 330 is depicted in FIG. 3 for ease of explanation, embodiments of the invention may comprise any number of silicon modules 330.

Platform module 340 publishes all the DXE Protocols and PPIs that are required by hardware-specific silicon module 330. Because the interface between the silicon modules 330 and the platform module 340 is un-architected, the list of specific DXE Protocols and PPIs will be different across differing platform families (e.g., CRBs). In addition, platform module 340 also publishes DXE protocols and PPIs as may be required by core components of the system module 310.

A single implemented platform module 340 may thus be used to support a great number of boards having designs based on a particular platform family. Platform module 340 is typically designed to provide all functionalities available for a particular platform family, and conforms to a specified default behavior. The default behavior may be controlled to some extent by build-time configuration parameters, run-time configuration parameters, and by run-time call outs to board module 350.

Configuration build parameters are collected by build tools and provided to all components in the system module 310 through project.h (containing C-style definitions) and project.inc (containing assembler-style definitions) files. The run-time configuration, including changes to code paths, is made available through the board library APIs. In addition, platform module 340 queries the board module 350 prior to performing certain default initialization paths. This allows board module 350 to indicate that it has "claimed" this action, in which case platform module 340 will skip that step. Platform module 340 may also call board module 350 at particular stages to allow it to perform additional board-design specific work.

Still referring to FIG. 3, system module 310 may call 312 platform module 340 using core protocols and PPIs 374. Platform module 340 may, in turn, call 344 down to kernel 360 using kernel APIs 375. Kernel 360 may also be called by board module 350 using kernel APIs 375.

More generally, silicon module 330 may call 332 the platform module 340 using silicon vendor protocols and PPIs 372. Also, executive module 320 may, among its many features, provide hardware policy information to platform module 340 via its exec board library functions 376. Platform module 340 provides the PPIs and protocols needed by families of silicon modules 330. Platform module 340 calls board library functions to allow the customer to implement code in the board module 350 that modifies the default behavior, as described above. If the customer does not implement any board library function, the version of the function provided by Executive Board Library is linked, and this version typically returns "do the default work", as described below. Platform module 340 is created once, for a family of silicon components, and is not modified by the customer.

Still referring to FIG. 3, platform module 340 may provide support for families of silicon component modules. At its upper edge, platform module 340 provides an agreed set of PPIs and protocols required by the drivers of silicon components. Platform module 340 is also responsible for implementing the algorithms required for enabling, disabling, and configuration of platform family hardware components, whether through a hardware component supplier specific protocol and PPI call/return values, or direct manipulation of the hardware. Platform module 340 also provides a set of configuration build parameters as default policies in a respective MODULE.DEF file to indicate hardware-specific functionality associated with a particular platform family. These values may be overridden by board module 350 and project level definitions in MODULE.DEF and PROJECT.DEF files, respectively. At its lower edge, platform module 340 calls 342 the board module 350 through a strongly-architected board-lib interface 378. This interface between the platform module 340 and the board module 350 is used to query policy questions, provide an opportunity to perform board design specific algorithms, and perform additional board specific work at particular stages of platform initialization.

The core components of executive module 320 provide the default set of methods that define the interface between platform and board modules 340 and 350. The default methods return values indicating to "do the default action" or "no work to be performed". This set of methods/functions builds to a library, called exec-board library (ExecBoardLib). The ExecBoardLib is included by a project DSC file after the board-level overrides, so these default methods are available and will be called for all references to methods not defined by board module 350. Each of the ExecBoardLib functions is empty and returns a status code that indicates the function is not implemented, and therefore the default behavior should be applied by platform module 340. Thus, the customer is only asked to implement the Board Library files that contain the methods/ functions desired to implement. The set of methods/functions in the board module builds to a library, called board library (BoardLib). If the customer implements the function, the call from platform module 340 will be linked to the board library function in board module 350 at build time. If the customer has not implemented the function, the call from platform module 340 will be linked, at build time, to the default ExecBoardLib function.

The Board module 350 provides the centralized location for OEM or ODM-written code that implements customization policies that define hardware and feature differences between the CRB and the OEM/ODM board. From a packaging point of view, board module 350 may consist of C source files containing implementations of functions written by the OEM or OFM. Board module 350 may also include PEI and DXE drivers, custom libraries, and other design or customer specific source codes.

Board module 350 is compiled into a library that supplies the functions called by platform module 340. Board module 350 is responsible for implementing functions that override the default methods provided by ExecBoardLib to account for hardware related differences between the original CRB and the board-specific designs by the customer. This set of override methods builds to a library, called BoardLib. This library is included by the project DSC file before the ExecBoardLib. Board module 350 contains a respective module definition configuration file (MODULE.DEF). This file serves multiple purposes. One purpose is to specify the platform family that supports board module 350. Another purpose is to provide hardware-related configuration parameter overrides for the defaults provided by platform module 340. These overrides are indicative of the hardware differences between the original CRB and the board-specific designs by the customer.

The platform customization described above suffers from certain shortcomings that can be mitigated by the present embodiments. For example, platform module 340 may be quite complicated, typically containing hundreds of source code files. The engineer who implements this code must ensure that all architected board library functions are being called at the correct times and under the correct circumstances. This will require not only diligence, but an almost expert knowledge of the available board library functions. Calling these functions at the wrong times may lead to errors following incorrect code paths due to incorrect processing of the return value from the function call, and even failure to include the call-out at all. Anyone of these errors could result in a customer spending large quantities of engineering time to debug to and find out why implementation of an override or some library functions does not result in the expected behavior.

In addition, the described solution may impose a burden on platform module 340 to include all architected Board Library function callouts to provide the customization solution. This effort also requires an almost expert knowledge, and due diligence by the engineer to ensure that all architected board library function callouts have been implemented in platform module 340, and that platform module 340 responds appropriately to the return values of these calls.

Moreover, the set of board library functions may not be mature, and it is very likely that additional functions will need to be added to support future customer needs and wishes.

Even after the set of board library functions mature, there may be occasions to add functions to the set. Because platform module 340 is responsible for calling the board library functions, platform module 340 will need to be modified to support the new functions. This will not only require additional engineering effort, but awareness of which platforms support only the older set of board library functions, and management decisions of which platforms should be upgraded to support the new functions. Additionally, older platform codes that are cloned to provide a starting point for new platforms may not contain new board library function calls, requiring additional engineering effort to identify and add the missing function calls.

Finally, there may be occasions to remove architected functions in response to support added to other components that cause these functions to be obsolete. Because platform module 340 is written expecting a specific set of library functions, more modifications may be required to remove callouts to functions that were deleted from the set of library functions. This will not only require additional engineering effort, but awareness of which platforms support the older set of board library functions and management decisions of which platform codes should be upgraded to support the changes. In addition, a platform code that is cloned to provide a starting point for new platforms may contain deprecated board library functions, again requiring additional engineering effort to identify and remove the deprecated function calls. The present embodiments, as described below with respect to FIGS. 4 and 5, alleviate these drawbacks by removing the burden of calling board library functions from the platform module.

Figure 4:
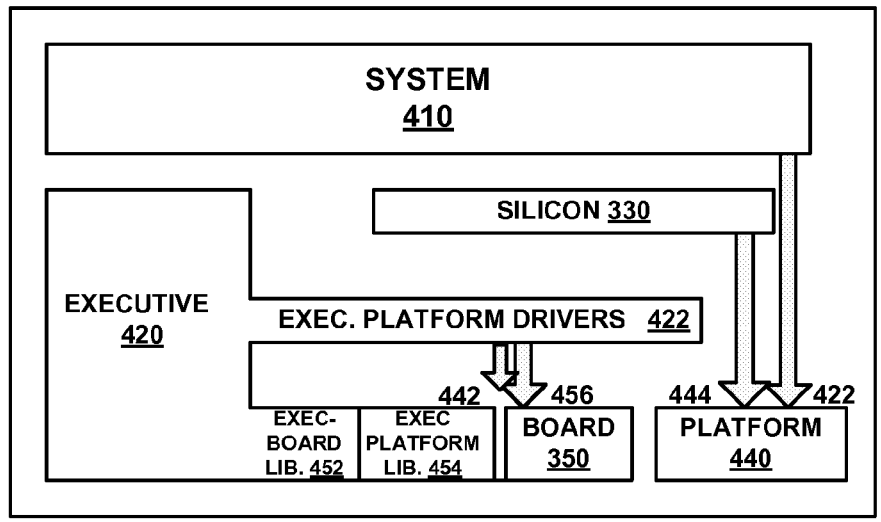
FIG. 4 is a block diagram illustrating a platform customization interface in accordance with some embodiments.

FIG. 4 is a block diagram illustrating a platform customization interface architecture 400 in accordance with some embodiments. Architecture 400 includes multiple UEFI compatible firmware modules including a system 410, executive module 420, silicon module 330, executive platform drivers 422, a platform module 440, board module 350, executive platform library 454, and executive board library 452, which are linked to build a UEFI compatible firmware component.

The system module 410 includes a number of components, such as Console, DataHub, Debugger, Disk, and the like, which work together to provide generic functionalities that are used across many projects, regardless of the particular hardware component. System module 410 directly calls platform module 440 using core protocols/P PIs 422. Also, silicon module 330 uses hardware component supplier protocols/P PIs 444 to call platform module 440. In stark contrast to the architecture of FIG. 3, platform module 440, however, does not have to call board module 350, thus, its drivers remain unaffected by any customization effort due to changes in board library functions. Instead, some codes of platform module 340 of FIG. 3 are converted to library functions, which are created in platform module 440. In some embodiments, the library functions in platform module 440 may still be CRB specific.

In embodiments, the call-outs to board module 350 are performed by executive platform drivers 422. Executive platform drivers 422 are created in executive module 420, which is an architectural layer that defines and implements policy-based decisions, such as hardware policies or run-time configuration policies. Executive platform drivers 422 call board module 350 through board-lib interface 456. This interface between the executive platform drivers 422 and board module 350 is used to query policy questions, provide an opportunity to perform board design specific algorithms, and perform additional board specific work at particular stages of initialization.

With the changes introduced by the present embodiments, rather than platform drivers being loaded and started by UEFI dispatchers, executive platform drivers 422 are loaded and executed. This provides a single, central location to place all the board library function callouts. Throughout the power-on self test (POST), as each driver of executive platform drivers 422 loads, it calls the appropriate board library functions. More specifically, the call is made to board module 350 and if not implemented, it calls the platform module 440. There may also be many Platform Library functions to request the platform module 440 to perform certain functions at particular times (e.g., prepare for memory configuration, install SMI callback functions, install legacy PCI callback functions, etc.). This relates to "each hardware initialization phase" referenced below. After the platform library call, the Board Library might be called to give the board module a chance to modify values. For example, executive platform driver 442 may call a "PlatformGetProtocolList" function. The platform library function returns a list of protocols to be installed. The executive platform driver 442 then calls a "BoardInstallProtocolList" function to allow the Board module to override values. If not implemented, executive platform driver 442 installs the protocol list.

If the customer has implemented the function, the call will be linked at build time to the customer's function in board module 350, and executive platform drivers 422 will skip calling the platform module's default implementation library. If the customer has not implemented the function, then the call will be linked to the default executive board library functions 452, and executive platform drivers 422 will then call the platform module's default implementation library function. For compatibility between the older and newer platform modules 340 and 440, a set of default executive platform library functions 454 is implemented to serve as empty functions, similar to the default executive board library functions 452, for cases where platform module 440 does not require certain work to be performed.

As described above, in the present embodiments platform module 440 is no longer required to implement the board library function calls, thus, platform module 440 becomes simpler to implement. Also the necessity for expert knowledge of the board library functions by platform module engineers will be removed. In addition, since the calls are made from a single executive driver, rather than multiple platform module drivers, it is simpler to ensure that all architected board library functions are called, and called at the appropriate times. Once the executive drivers of executive platform drivers 422 have been verified, function call related errors are virtually eliminated.

Another benefit of the present embodiments is the removal of additional engineering effort required to provide this customization solution during the platform module development. While some effort will be required to translate and modify the existing platform drivers into the required executive platform library functions 454, these functions will be well defined, and should result in little effort to copy and paste code into the appropriate routines. In addition, writing new platform module 440 will only require adding code to the architected executive platform library functions 454 defined for each hardware initialization phase.

Additionally, as the new executive board library functions 452 are added, the executive platform drivers 422 will be modified to support the new functions. The new executive platform library functions 454 will be added as empty functions, and therefore the new library functions will not impact existing or older projects. With this method, a board module 350 can immediately implement the new functions and affect behavior with no change required in platform module 440.

When one or more board library functions are deleted by the customer, executive platform drivers 422 and executive platform library functions 454 will be modified to account for the deleted functions. However, since this may affect older projects that rely on the deprecated functions, executive module 420 may have to be versioned.

Figure 5:
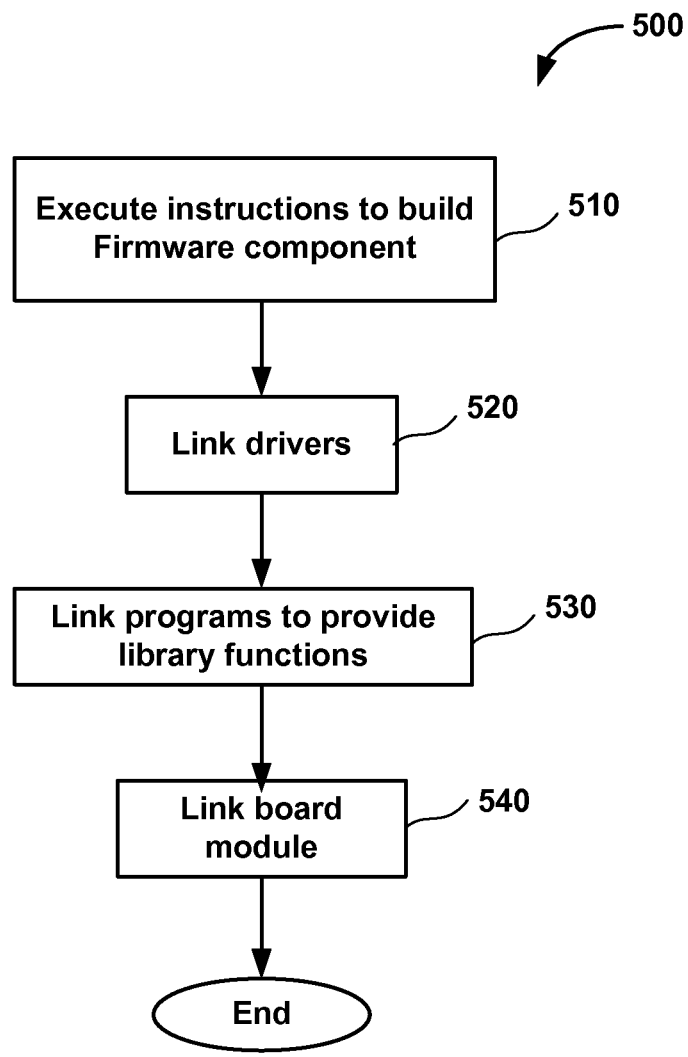
FIG. 5 is a flowchart illustrating the functional steps of customizing a UEFI compatible firmware component in accordance with some embodiments.

FIG. 5 is a flowchart 500 illustrating the functional steps of customizing a UEFI compatible firmware component in accordance with some embodiments. Flowchart 500 starts by executing, by CPU 210 of FIG. 2, a sequence of instructions to build a UEFI compatible firmware component (510). One or more drivers of executive platform drivers 422 of FIG. 4 are linked into the firmware component (520). Next, one or more programs for providing one or more library functions, such as executive board library functions 452 and executive platform library functions 454, both of FIG. 4, to the drivers of executive platform drivers 422 are linked into the firmware component (530). Board module 350 of FIG. 4 is then linked to the firmware component to provide a board library function (540). The board library function replaces one or more library functions, such as executive board library functions 452. The board library function provided by board module 350 may reflect a change in the design of CRB 110 of FIG. 1.

One or more embodiments described herein provide that methods, techniques, and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium such as disk 260 of FIG. 2. Numerous machines, such as system 200 of FIG. 2, may provide examples of processing resources and computer-readable mediums, on which instructions for implementing present embodiments can be carried and/or executed. In particular, the numerous machines include processor(s) and various forms of memory for holding data and instructions. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs or a computer usable carrier medium capable of carrying such a program.

While the present embodiments have been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method for customizing a Unified Extensible Firmware Interface (UEFI) compatible firmware component, the method comprising:
   executing, by a processor, a sequence of instructions to build the firmware component by:
   linking one or more executive drivers into the firmware component, wherein the one or more executive drivers are loaded and started by one or more UEFI dispatchers;
   wherein the firmware component includes a driver for a silicon component in the CRB;
   linking a silicon module including at least one UEFI compatible program for driving the silicon component;
   linking, to the one or more executive drivers, a platform module comprising one or more library functions, wherein the platform module is called by the one or more executive drivers and contains default library functions for a plurality of Customer Reference Boards (CRBs); and
   linking a board module into the firmware component, the board module providing a board library function to replace at least one of the library functions, and wherein the board library function reflects a change in a Customer Reference Board (CRB),
   wherein the one or more executive drivers first call a particular board library function of the board module and upon the one or more executive drivers determining that the particular board library function is not implemented, the one or more executive drivers call the particular board library function provided by the platform module.

2. The method of claim 1, wherein the platform module includes at least one UEFI compatible program for providing platform services to programs in the silicon module.

3. The method of claim 2, wherein providing platform services comprises providing a Pre-EFI module to Pre-EFI module Interface (PPI), and wherein programs in the silicon module use the PPI.

4. The method of claim 2, wherein providing platform services comprises providing a Driver Execution Environment (DXE) interface, and wherein programs in the silicon module use the DXE interface.

5. The method of claim 1, wherein providing the board library function comprises providing a Driver Execution Environment (DXE) interface.

6. The method of claim 1, wherein the one or more executive drivers comprise executive platform drivers, which are linked as a portion of an executive module including UEFI compatible programs for calling the one or more library functions that include executive board library functions and executive platform library functions.

7. The method of claim 1, wherein programs in the board module are modified according to the changes in the CRB.

8. An apparatus comprising:
   one or more processors;
   a Customer Reference Board (CRB) including a silicon component; and
   memory having instructions encoded therein, the instructions when executed by the one or more processors cause the processor to:
   build a Unified Extensible Firmware Interface (UEFI) compatible firmware component by
   linking one or more executive drivers into the firmware component, wherein the one or more executive drivers are loaded and started by one or more UEFI dispatchers;
   wherein the firmware component includes a driver for the silicon component in the CRB;
   linking a silicon module including at least one UEFI compatible program for driving the silicon component;
   linking, to the one or more executive drivers, a platform module comprising one or more library functions, wherein the platform module is called by the one or more executive drivers and contains default library functions for a plurality of Customer Reference Boards (CRBs); and
   linking a board module into the firmware component, the board module providing a board library function to replace at least one of the library functions, and wherein the board library function reflects a change in the CRB,
   wherein the one or more executive drivers first call a particular board library function of the board module and upon the one or more executive drivers determining that the particular board library function is not implemented, the one or more executive drivers call the particular board library function provided by the platform module.

9. The apparatus of claim 8, wherein the one or more executive drivers comprise executive platform drivers, which are linked as a portion of an executive module including UEFI compatible programs for providing executive board library functions and executive platform library functions.

10. The apparatus of claim 8, wherein programs in the board module are modified according to the changes in the CRB.

11. A non-transitory computer-readable medium having instructions encoded therein, the instructions when executed by one or more processors perform a method comprising:
   building a Unified Extensible Firmware Interface (UEFI) compatible firmware component including:
   linking one or more executive drivers into the firmware component, wherein the one or more executive drivers are loaded and started by one or more UEFI dispatchers;
   wherein the firmware component includes a driver for a silicon component in the CRB;
   linking a silicon module including at least one UEFI compatible program for driving the silicon component;
   linking, to the one or more executive drivers, a platform module comprising one or more library functions, wherein the platform module is called by the one or more executive drivers and contains default library functions for a plurality of Customer Reference Boards (CRBs); and
   linking a board module into the firmware component, the board module providing a board library function to replace at least one of the library functions, and wherein the board library function reflects a change in a Customer Reference Board (CRB),
   wherein the one or more executive drivers first call a particular board library function of the board module and upon the one or more executive drivers determining that the particular board library function is not implemented, the one or more executive drivers call the particular board library function provided by the platform module.

12. The non-transitory computer-readable medium of claim 11, wherein the platform module includes at least one UEFI compatible program for providing platform services to programs in the silicon module.

13. The non-transitory computer-readable medium of claim 12, wherein providing platform services comprises providing a Pre-EFI module to Pre-EFI module Interface (PPI), and wherein programs in the silicon module use the PPI.

14. The non-transitory computer-readable medium of claim 11, wherein the one or more executive drivers comprise executive platform drivers, which are linked as a portion of an executive module including UEFI compatible programs for calling the one or more library functions that include executive board library functions and executive platform library functions, and wherein programs in the board module are modified according to the changes in the CRB.

* * * * *